US006973547B2

(12) United States Patent
Nilsson et al.

(10) Patent No.: US 6,973,547 B2
(45) Date of Patent: Dec. 6, 2005

(54) COHERENCE MESSAGE PREDICTION MECHANISM AND MULTIPROCESSING COMPUTER SYSTEM EMPLOYING THE SAME

(75) Inventors: Jim Nilsson, Gothenburg (SE); Anders Landin, San Carlos, CA (US); Per O. Stenström, Gothenburg (SE)

(73) Assignee: Sun Microsystems, Inc., Santa Clara, CA (US)

( * ) Notice: Subject to any disclaimer, the term of this patent is extended or adjusted under 35 U.S.C. 154(b) by 294 days.

(21) Appl. No.: 10/298,244

(22) Filed: Nov. 15, 2002

(65) Prior Publication Data

US 2003/0154351 A1 Aug. 14, 2003

Related U.S. Application Data

(60) Provisional application No. 60/332,945, filed on Nov. 16, 2001.

(51) Int. Cl.[7] ............................................. G06F 12/00
(52) U.S. Cl. ...................................... 711/141; 711/137
(58) Field of Search ................ 711/128, 133, 136–137, 711/141–145

(56) References Cited

U.S. PATENT DOCUMENTS

| | | | | |
|---|---|---|---|---|
| 5,619,676 | A * | 4/1997 | Fukuda et al. ............... | 711/137 |
| 6,629,210 | B1 * | 9/2003 | Arimilli et al. ............. | 711/141 |
| 6,711,651 | B1 * | 3/2004 | Moreno et al. ............. | 711/141 |
| 6,839,648 | B1 * | 1/2005 | Burlison ..................... | 702/119 |
| 2002/0161976 | A1 * | 10/2002 | Ito et al. ...................... | 711/128 |

OTHER PUBLICATIONS

International search report application No. PCT/US02/36772 mailed Mar. 18, 2003.

"Using Prediction to Accelerate Coherence Protocols", Mukherjee, et al, 25th Annual International Symposium on Computer Architecture, ISCA '98, Barcelona, Jun. 27, 1998, pp. 179-190.

"Memory Sharing Predictor: The Key to a Speculartive Coherent DSM", Lai, et al, Computer Architecture News, Association for Computing Machinery, New York, vol. 27, No. 2, May 1999, pp. 172-183.

"Selective, Accurate, and Timely Self-Invalidation Using Last-Touch Prediction", Lai, et al, Computer Architecture News, Association for Computing Machinery, New York, vol. 28, No. 2, May 2000, pp. 139-148.

"Alternative Implementations of Two-Level Adaptive Branch Prediction", Yeh, et al, Annual ACM Workshop on Computational Learning Theory, Aug. 27, 1992, pp. 124-134.

Abdel-Shafi, et al, "An Evaluation of Fine-Grain Producer-Initiated Communication in Cache-Coherent Multiprocessors", Proceedings of the 3rd IEEE Symposium on High-Performance Computer Architecture (HPCA '97), San Antonio, TX, Feb. 1997.

Cox, et al, "Adaptive Cache Coherency for Detecting Migratory Shared Data", In Proc. of the 20th Annual Int'l Symp. on Computer Architecture (ISCA '93), pp. 98-108, May 1993.

Grahn, et al, "Evaluation of a Competitive-Update Cache Coherence Protocol with Migratory Data Detection" Journal of Parallel and Distributed Computing, 39(2): 168-180, Dec. 1996.

(Continued)

Primary Examiner—Nasser Moazzami
(74) Attorney, Agent, or Firm—Meyertons Hood Kivlin Kowert & Goetzel, P.C.; B. Noël Kivlin (57) ABSTRACT

A coherence prediction mechanism includes a history cache for storing a plurality of cache entries each storing coherence history information for a corresponding block of data. Entries in the history cache are used to index into a pattern memory containing coherence predictions.

25 Claims, 5 Drawing Sheets

OTHER PUBLICATIONS

Hill, et al, "Cooperative Shared Memory: Software and Hardware for Scalable Multiprocessors", *IEEE Trans. on Computer Systems,* 11(4):300-318, Nov. 1993.

Kaxiras, "Identification and Optimization of Sharing Patterns for Scalable Shared-Memory Multiprocessors", PhD Thesis, University of Wisconsin-Madison, 1998.

Kaxiras, et al, "Improving CC-NUMA Performance Using Instruction-Based Prediction", In Procedures of HPCA-5, pp. 161-170, Jan. 1999.

Kaxiras, et al, "Coherence Communication Prediction in Shared-Memory Multiprocessors", *In Proc. of HPCA 5,* pp. 156-157, Jan. 2000.

Koufaty, et al, "Data Forwarding in Scalable Shared-Memory Multiprocessors", *IEEE Trans. on Parallel and Distributed Systems,* 7(12): 1250-1264, Dec. 1996.

Laudon, et al, "The SGI Origin: A CCNUMA Highly Scalable Server", *In Proc. of ISCA-24,* pp. 241-251, 1997.

Lebeck, et al, "Dynamic Self-Invalidation: Reducing Coherence Overhead in Shared Memory Multiprocessors", *In Proc. of ISCA-22,* pp. 48-59, Jun. 1995.

Lenoski, et al, "The Directory-Based Cache Coherence Protocol for the DASH Multiprocessor", *In Proc. of ISCA-17,* pp. 148-159, May 1990.

Magnusson, et al, "SimICS/sun4m: A virtual Workstation", *In Proc. of Usenix Annual Technical Conf.,* Jun. 1998.

Skeppstedt, et al, "Simple Compiler Algorithms to Reduce Ownership Overhead in Cache Coherence Protocols", *In Proc. of ASPLOS-6,* pp. 325-337, 1994.

Stenstrom, et al, "An Adaptive Cache Coherence Protocol Optimized for Migratory Sharing", *In Proc. of ISCA-20,* pp. 109-118, 1993.

Woo, et al, "The SPASH-2 Programs: Characterization and Methodological Considerations", *In Proc. of ISCA 22,* pp. 24-36, Jun. 1995.

* cited by examiner

COHERENCE MESSAGE PREDICTION MECHANISM AND MULTIPROCESSING COMPUTER SYSTEM EMPLOYING THE SAME

BACKGROUND OF THE INVENTION

This application claims the benefit of Provisional Application Ser. No. 60/332,945 filed Nov. 16, 2001.

1. Field of the Invention

This invention relates to the field of multiprocessor computer systems and, more particularly, to mechanisms and methods for predicting coherence operations in multiprocessor computer systems.

2. Description of the Related Art

A popular architecture in commercial multiprocessing computer systems is a distributed shared memory architecture. A distributed shared memory architecture includes multiple nodes within which processors and memory reside. The multiple nodes communicate via a network coupled there between. When considered as a whole, the memory included within the multiple nodes forms the shared memory for the computer system. Typically, directories are used to identify which nodes have cached copies of data corresponding to a particular address. Coherency activities may be generated via examination of the directories.

Distributed shared memory systems are scaleable, overcoming various limitations associated with shared bus architectures. Since many of the processor accesses are completed within a node, nodes typically have much lower bandwidth requirements upon the network in comparison to the bandwidth requirements a shared bus architecture must provide upon its shared bus to attain comparable performance. The nodes may operate at high clock frequency and bandwidth, accessing the network when needed. Additional nodes may be added to the network without affecting the local bandwidth of the nodes. Instead, only the network bandwidth is affected.

Coherence activities in shared memory multiprocessing systems remain an increasingly important bottleneck that can limit high performance. In general, coherence activities may be performed in response to a memory access request initiated within a node for a given data block. The coherence activities may include the invalidation of copies of the data block in the memories/caches of other nodes, as well as the transfer of the data block to the requesting node. In many instances, the coherence activities must be completed before the memory access request within the node can be completed. Thus, the required coherence activities may lead to increased latencies in completing memory access requests, particularly when overall network traffic is high.

To alleviate bottlenecks associated with coherence activities, various coherence prediction mechanisms have been proposed that operate to identify certain memory access message patterns and to provide an indication of subsequent predicted coherence activities. Based on a given prediction, various coherence operations may be speculatively performed in anticipation of a subsequent memory access message. For example, the coherence operations may include the invalidating of copies of a given block in various nodes and/or the pushing or transfer of the block to a future consumer. If the coherence operations are properly predicted, latencies in completing a subsequent memory access request may be reduced.

In some implementations of coherence prediction mechanisms, a message history table may be maintained that stores a history of memory access messages associated with each memory block. The message history table includes an entry for every data block for which predictions may be made. Each entry may typically store a history of from 1 to 4 memory access messages associated with the corresponding data block. The history information is used to index into a pattern history table containing predictions of coherence messages following a particular history of memory access messages. When a given entry in the message history table has been filled, the next incoming message to the memory block is used to populate the pattern history table. In this manner, when the history of memory access messages repeats, the corresponding entry in the pattern history table may be used to form the basis of a prediction.

While employment of such coherence prediction mechanisms within multiprocessing systems have in some instances accommodated overall higher performance, they may also be associated with various drawbacks. For example, some implementations are limited by a relatively shallow message history depth, thus restricting the coherence message signatures that can be identified, and thus prediction accuracy. Furthermore, since the message history table includes an entry for each memory block, the total required storage may be relatively significant. A coherence prediction mechanism is therefore desirable for a multiprocessing computer system that may attain relatively high prediction accuracy and that efficiently utilizes storage resources.

SUMMARY OF THE INVENTION

Various embodiments of a coherence message prediction mechanism for multiprocessing computer systems are disclosed. In one embodiment, a coherence prediction mechanism includes a history cache for storing a plurality of cache entries each storing coherence history information for a corresponding block of data. Entries in the history cache are used to index into a pattern memory containing coherence predictions.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

Figure 1:
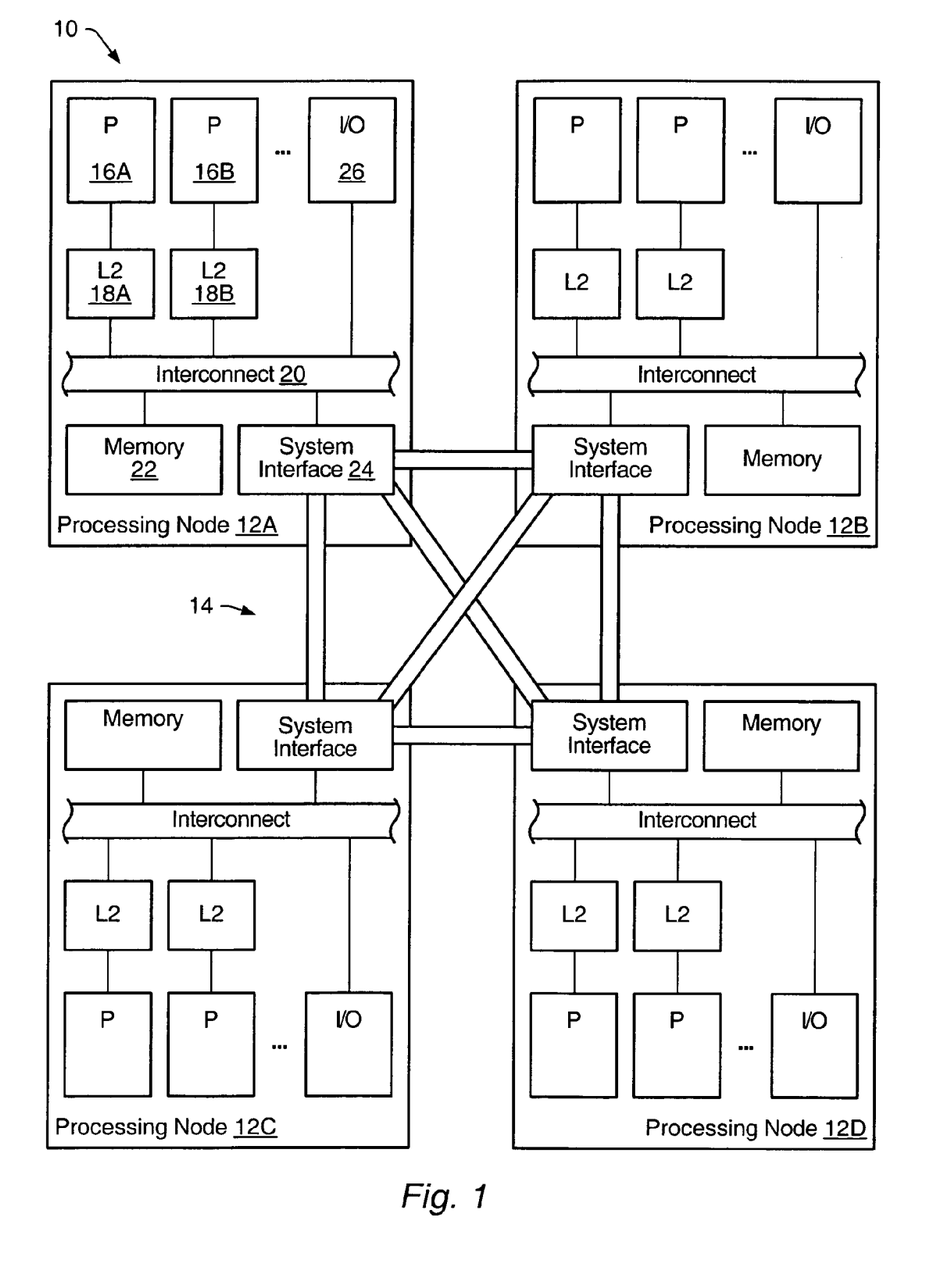
FIG. 1 is a block diagram of a multiprocessing computer system.

Turning now to FIG. 1, a block diagram of one embodiment of a multiprocessing computer system 10 is shown. Computer system 10 includes multiple processing nodes 12A–12D interconnected by a point-to-point network 14. Elements referred to herein with a particular reference number followed by a letter will be collectively referred to by the reference number alone. For example, processing nodes 12A–12D will be collectively referred to as processing nodes 12. In the embodiment shown, each processing node 12 includes multiple processors, caches, a memory, and a system interface. For example, processing node 12A is configured with multiple processors including processors 16A–16B. The processors 16 are connected to caches 18, which are further coupled to a node interconnect 20. Additionally, a memory 22 and a system interface 24 are coupled to node interconnect 20. Still further, one or more input/output (I/O) interfaces 26 may be coupled to node interconnect 20. I/O interfaces 26 are used to interface to peripheral devices such as serial and parallel ports, disk drives, modems, printers, etc. Other processing nodes 12B–12D may be configured similarly.

Each processing node 12 is a processing node having memory 22 as the shared memory. Processors 16 are high performance processors. In one embodiment, each processor 16 may employ an ultraSPARC™ processor architecture. It is noted, however, that any processor architecture may be employed by processors 16.

Typically, processors 16 may include internal instruction and data caches. Therefore, caches 18 are labeled as L2 caches (for level 2, wherein the internal caches are level 1 caches). If processors 16 are not configured with internal caches, then external caches 18 are level 1 caches. It is noted that the "level" nomenclature is used to identify proximity of a particular cache to the processing core within processor 16. Level 1 is nearest the processing core, level 2 is next nearest, etc. Caches 18 provide rapid access to memory addresses frequently accessed by the processor 16 coupled thereto. Caches 18 may be configured in any of a variety of specific cache arrangements. For example, set-associative or direct-mapped configurations may be employed. In some embodiments, the processors 16 and caches 18 of a node may be incorporated together on a single integrated circuit in a chip multiprocessor (CMP) configuration. In other embodiments, a given processing node may include a single processor rather than multiple processors.

Node interconnect 20 accommodates communication between processors 16 (e.g., through caches 18), memory 22, system interface 24, and I/O interface 26. In one embodiment, node interconnect 20 includes an address bus and related control signals, as well as a data bus and related control signals. Because the address and data buses are separate, a split-transaction bus protocol may be employed upon node interconnect 20. Generally speaking, a split-transaction bus protocol is a protocol in which a transaction occurring upon the address bus may differ from a concurrent transaction occurring upon the data bus. Transactions involving address and data include an address phase in which the address and related control information is conveyed upon the address bus, and a data phase in which the data is conveyed upon the data bus. Additional address phases and/or data phases for other transactions may be initiated prior to the data phase corresponding to a particular address phase. An address phase and the corresponding data phase may be correlated in a number of ways. For example, data transactions may occur in the same order that the address transactions occur. Alternatively, address and data phases of a transaction may be identified via a unique tag.

In alternative embodiments, node interconnect 20 may be implemented as a circuit-switched network or a packet-switched network. In embodiments where node interconnect 20 is a packet-switched network, packets may be sent through the data network using techniques such as wormhole, store and forward, or virtual cut-through. In a circuit-switched network, a particular device may communicate directly with a second device via a dedicated point-to-point link that may be established through a switched interconnect mechanism. To communicate with a different device, a different link is established through the switched interconnect. In some embodiments, separate address and data networks may be employed.

Memory 22 is configured to store data and instruction code for use by processors 16. Memory 22 preferably comprises dynamic random access memory (DRAM), although any type of memory may be used. Memory 22, in conjunction with similar illustrated memories in the other processing nodes 12, forms a distributed shared memory system. Each address in the address space of the distributed shared memory is assigned to a particular node, referred to as the home node of the address. A processor within a different node than the home node may access the data at an address of the home node, potentially caching the data. Therefore, coherency is maintained between processing nodes 12 as well as among processors 16 and caches 18 within a particular processing node 12A–12D. In one embodiment, the system interface 24 of each node may include a coherence controller to provide internode coherency.

In various embodiments, portions of memory 22 may be allocated to cache data that is mapped to other nodes (i.e., data having remote home nodes). In this manner, data accessed by a processor 16 may be cached in an allocated location of the memory 22 of that node to allow quicker subsequent accesses to the data.

In addition to maintaining internode coherency, system interface 24 may receive transactions through node interconnect 20 which require a data transfer to or from another processing node 12. System interface 24 performs the transfer, and provides the corresponding data for the transaction upon node interconnect 20, if appropriate. In the embodiment shown, system interface 24 is coupled to a point-to-point network 14. However, it is noted that in alternative embodiments other interconnect structures may be used.

Figure 2:
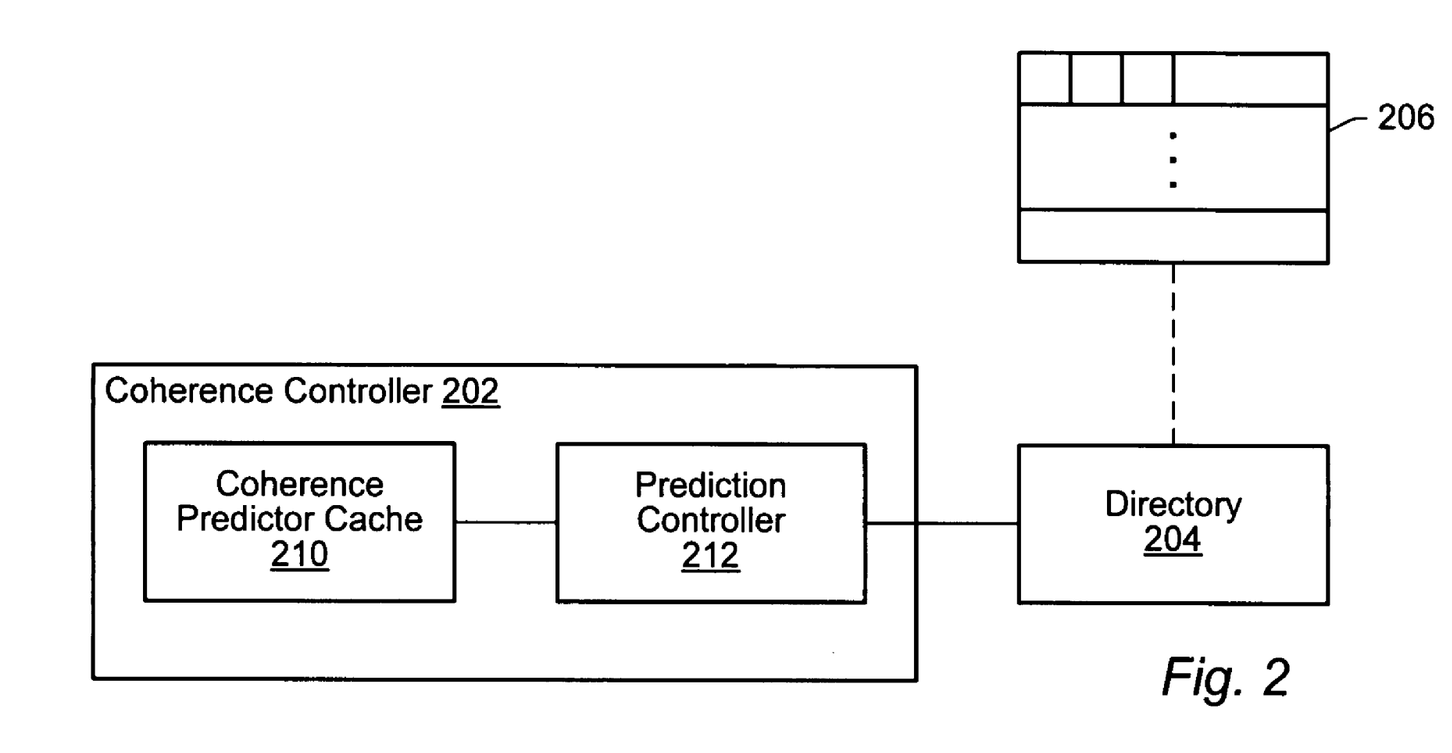
FIG. 2 is a block diagram illustrating one embodiment of a coherence controller.

FIG. 2 is a block diagram illustrating one embodiment of a coherence controller 202 provided within each system interface 24. In general, the coherence controller 202 of each node is provided to control coherence activities associated with data blocks for which the associated node is the home node. For this purpose, coherence controller 202 may maintain a directory 204 containing a plurality of directory entries 206 each corresponding to a particular data block. Each directory entry may include an indication of which nodes contain copies of the data block (e.g., in either a shared or exclusive state), as well as an indication of the owner of the data block. Coherence controller 202 controls coherence activities, such as the transmission of coherence demands to various nodes, based on the information within the directory and the type of memory access request being serviced. Various specific directory entry formats are possible, as desired, depending upon the particular coherence protocol employed.

In one embodiment, coherence controller 202 is configured to receive both locally generated memory access requests (i.e., requests initiated by processors within the home node) and remotely generated memory access requests for which global coherence activity may be required. For example, a memory access request initiated by a processor of a given node may initiate a write to a data block. If the directory entry indicates the data block is shared in any other node, the coherence controller 202 may transmit invalidation coherence demands to the sharing nodes to cause the shared copies of the data block to be invalidated. Similarly, if the data block is owned in another node, the coherence controller 202 may transmit a coherency demand to the owning node to cause the owning node to transfer the data block to the requesting node and to invalidate its copy. The coherency controller 202 completes the coherence operations by updating the corresponding directory entry to indicate the new state of the block in each node. Numerous variations of such coherence activities are possible in other embodiments.

As will be described in further detail below, coherence controller 202 also includes a coherence predictor cache 210 and a prediction controller 212. Coherence predictor cache 210 is provided to record a history of memory access messages associated with selected memory blocks and, for each of the various recorded histories, to provide a prediction of subsequent coherence activity. Prediction controller 212 is provided to initiate and control coherence operations, such as the transmission of coherence demands to various nodes, based on predictions provided from coherence predictor cache 210. Prediction controller 212 may access a corresponding directory entry to determine the appropriate coherence operations to initiate in response to a particular prediction provided from predictor cache 210.

Figure 3:
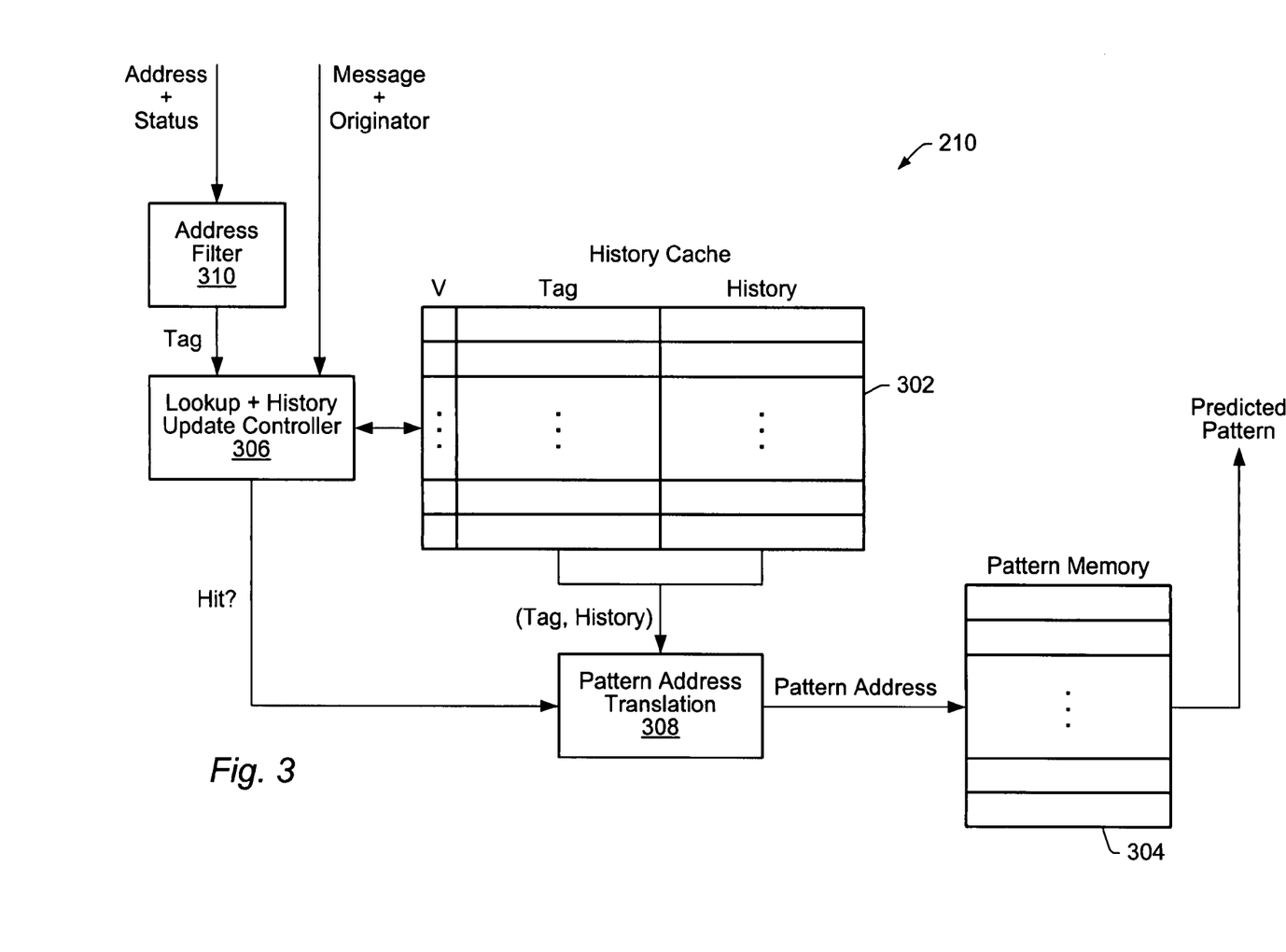
FIG. 3 is a block diagram of one embodiment of a coherence predictor cache.

FIG. 3 illustrates one embodiment of coherence predictor cache 210. In the illustrated embodiment, coherence predictor cache 210 includes a history cache 302, a pattern memory 304, and a controller 306. The coherence predictor cache 210 may further include a pattern address translation unit 308 and an address filter 310.

History cache 302 is a cache memory including a plurality of entries each configured to store within a history field a history of memory access messages associated with a corresponding data block. Each message may be stored as a tuple (type, p, where type is read, write, or upgrade and p is a vector indicating the originating processor or node). Each area of storage within the history field of a given entry for storing a memory access message is referred to herein as a slot. In addition to a history field, each entry may further include a tag field that stores a tag (i.e., selected bits of the block address that corresponds to the associated entry) and a valid bit. It is noted that the history field of each entry may have a relatively deep history depth. For example, in one embodiment, the history field of each entry may be configured to store indications of a history of 16 memory access requests associated with the corresponding cache line. In general, other embodiments are possible that have other history depths, including embodiments that employ history fields configured to store indications of at least eight access requests. In embodiments that employ relatively large history depths, more complex memory access signatures may be detected, thus increasing prediction accuracy.

Address filter 310 may be provided to receive incoming memory access messages (e.g., coherence messages generated both locally and by remote nodes) and to filter out certain messages. In one embodiment, address filter 310 filters out all messages other than read messages, write messages, and upgrade messages. Other embodiments are also possible that employ other filtering criteria or that do not filter incoming memory access messages.

Controller 306 is provided to receive the memory access messages filtered by address filter 310 and to determine whether an entry corresponding to the address of the block associated with the memory access message is contained in history cache 302. Controller 306 additionally includes functionality to update entries of history cache 302 as well as functionality to access and update entries of pattern memory 304, as discussed further below.

Pattern address translation unit 308 may be provided to generate a pattern address corresponding to an entry of history cache 302. The pattern address serves as an index into pattern memory 304, which contains predictions for coherence operations that may be speculatively performed by prediction controller 212. Further details regarding this functionality will be provided further below.

Figure 4:
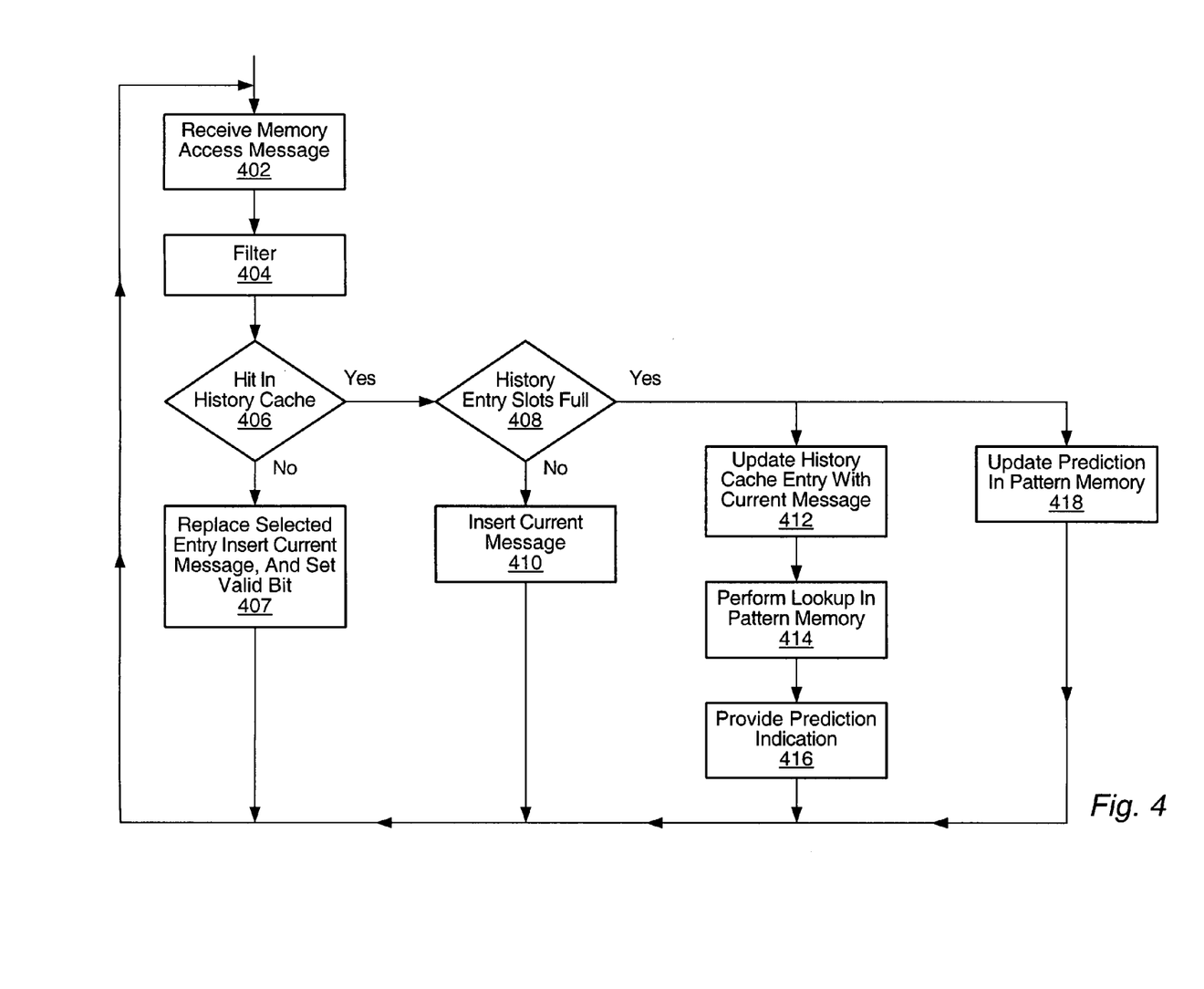
FIG. 4 is a flow diagram illustrating operations associated with one embodiment of a coherence predictor cache.

FIG. 4 is a flow diagram illustrating operations associated with one embodiment of coherence predictor cache 210. As depicted, when a memory access message is received (step 402), the received message may be filtered by address filter 310, as desired (step 404). If the memory access message is not filtered out in step 404, controller 306 performs a tag lookup in history cache 302 (step 406) to determine whether a hit has occurred (i.e., a match exists between a tag portion of the address of the incoming message and the tag of a corresponding tag field of a valid entry of history cache 302).

If a hit within history cache 406 does not occur, a selected entry within history cache 210 is replaced in accordance with a replacement algorithm, and a slot within the history field of the corresponding entry is filled with the current message (step 407). The valid bit for the entry is further set. In one embodiment, a least-recently used cache replacement algorithm is employed. It is noted, however, that in other embodiments, other replacement algorithms may be employed. In addition, it is also noted that in one embodiment history cache 210 is a set associative cache structure. In other embodiments, a fully associative cache structure or a direct map cache structure may alternatively be employed.

If a hit occurs in step 406, controller 306 determines whether all slots in the matched history entry are filled up with memory access messages (step 408). If the history entry contains empty slots, controller 306 inserts the current message in a corresponding slot (i.e., the slot for the most recent message) of the history entry (step 410), and operation resumes at step 402.

If all slots in the matching history entry are filled up, controller 406 updates the history entry with the current message in step 412. The updated history information and tag may then be provided to pattern address translation unit 308 which generates a pattern address which corresponds to the tag and history information. In one embodiment, pattern address translation unit 308 implements a hashing function to generate the pattern address. The pattern address is subsequently used to perform a lookup into pattern memory 304 (step 414). If the indexed location within pattern memory 304 contains a prediction, the prediction is provided to prediction controller 212 (step 416). Prediction controller 212 may responsively invoke particular coherence operatives, such as the transmission of specific coherency demands to various nodes, based on the prediction, as desired.

In addition to performing a lookup in pattern memory 414 to determine whether a prediction for the pattern (as updated with the current message) exists, controller 306 additionally includes functionality to update prediction information within pattern memory 304. More particularly, in response to receiving a new message and determining that a hit to a filled entry within history cache 302 exists in step 408, controller 306 updates the entry of pattern memory 304 that is indexed by the previously existing entry in history cache 302 (i.e., based on the history information in the history cache entry as it existed prior to being updated with the new message). The indexed location of pattern memory 304 is updated with an indication of the current memory access message. In accordance, the new message stored in the indexed location of pattern memory 304 forms a prediction for a later situation when the pattern repeats.

Figure 5:
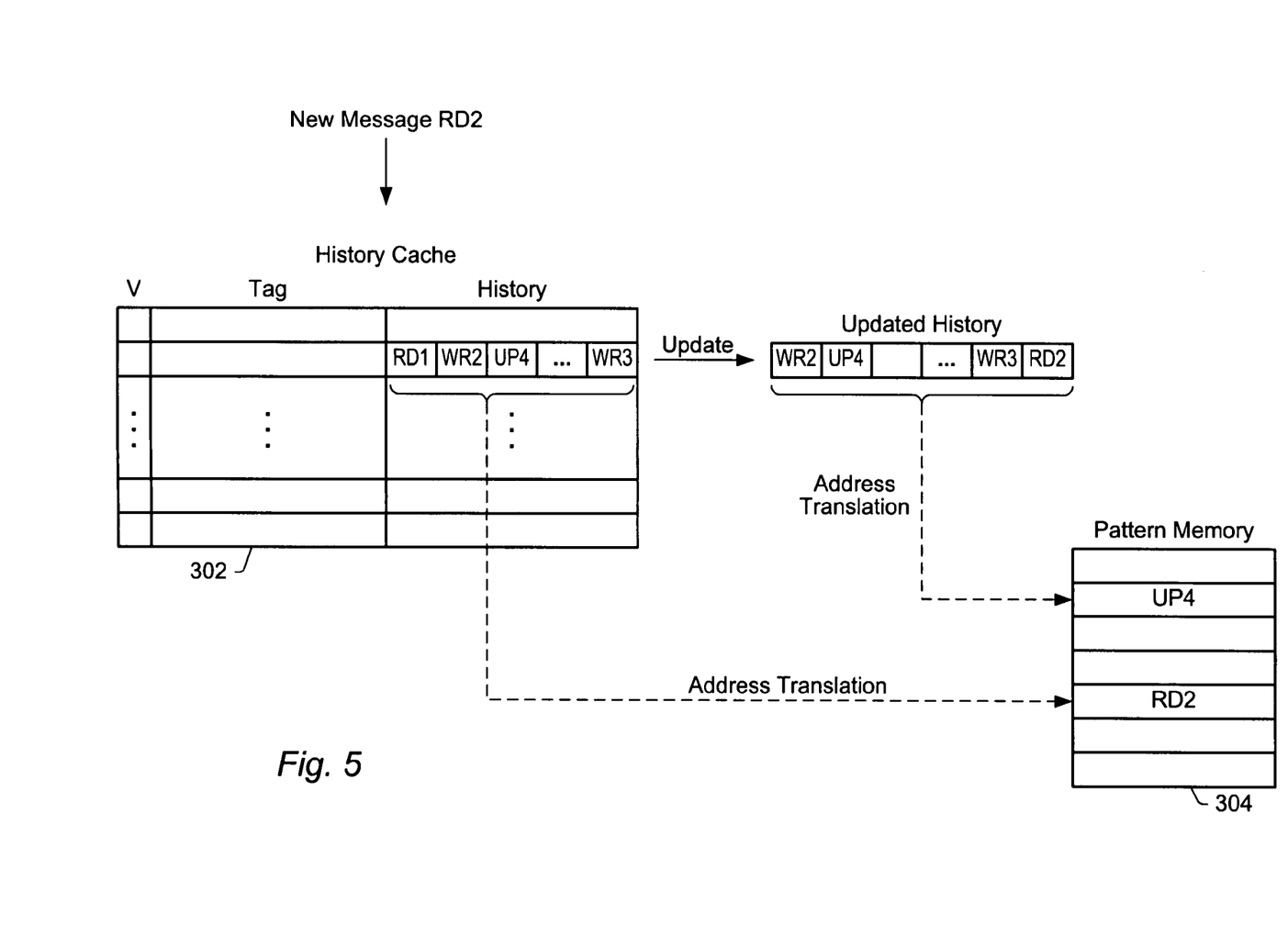
FIG. 5 illustrates an example in which a sequence of memory access messages are stored in an entry of a history cache.

FIG. 5 illustrates an example in which a sequence of memory access messages are stored in an entry of history cache 302. The earliest message indicates a read of the data block originating from node 1, and the most recent message indicates a write by node 3. Assume a new message is then received indicating a read by node 2. Pursuant to the operations depicted in FIG. 4, controller 306 responsively updates the entry of history cache 302 to indicate an updated history based on the newly received message. Thus, as depicted in FIG. 5, in this example the newly received memory access message corresponding to a read originating from node 2 is stored in the newest slot location and the older memory access messages associated with the block are shifted to corresponding slots, with the oldest memory access message being discarded. This updated history pattern along with the tag are translated by pattern address translation unit 308 to generate a corresponding pattern address to index into the pattern memory 304. If a prediction corresponding to the pattern address exists in pattern memory 304, prediction controller 212 performs corresponding speculative coherence operations, as discussed above. In the depicted example, the prediction indexed by the updated entry identifies an upgrade to the data block originating from node 3.

In addition, controller 306 additionally updates pattern memory 304 with the newly received memory access message as a predictor. The indexed storage location within pattern memory 304 to which this predictor is stored is dependent upon the history pattern as it existed prior to its update. That is, the pattern address generated by pattern address translation unit 308 to store the updated predictor is based on the entry of predictor cache 302 prior to being updated with the newly received memory access message. Thus, in the depicted example, an indication is stored in pattern memory 304 at the indexed location indicating a read operation originating from node 2.

Thus, if upon subsequent operations the history entry corresponding to the block again corresponds to the original pattern illustrated in FIG. 5, when a lookup within pattern memory 304 is performed to determine whether a prediction exists, the corresponding predictor (a read originating from node 2) will be provided. Prediction controller responsively performs coherence operations based on the predicted coherence message.

It is noted that while in the embodiment described above, both the tag and history information associated with an entry of history cache 302 is used in the translation by pattern address translation unit 308 to generate the pattern address to index into pattern memory 304, other embodiments are also possible. For example, in one alternative embodiment, only the history information contained in the entry of the history cache 302 is used by pattern address translation 308 in the translation. In such an embodiment, predictions are made based solely on history information with no distinction between the addresses for which the coherence messages are directed.

In addition, as stated previously, in other embodiments, other filtering criteria may be employed by address filter 310. For example, in one embodiment, only memory access messages corresponding to memory blocks experiencing coherence misses are provided to controller 306 for caching within history cache 302. One mechanism which may accomplish such filtering is to equip every memory block with a last-writer identifier, and to only present those addresses to the history cache 302 for which the last-writer does not match the reader at a read miss. The last-writer can be optionally reset at a read miss to minimize the probability for replacement-prone memory blocks to enter the history cache 302. In another embodiment, the address filter may be employed to strip the memory address of a number of its least-significant bits, to enable coherence predictions on block sizes that are different from the memory block size, e.g., on a page size granularity.

Finally, it is also noted that in other embodiments the form of prediction information stored within pattern memory 304 may vary. For example, while in the above embodiment, an indication of a predicted memory access message is provided in entries of pattern memory 304, indications of predicted coherence operations such as coherence demands may alternatively be stored in pattern memory 304 in other embodiments. In addition, entries within pattern memory 304 may include a valid field and/or a copy of the history information index to determine whether a given prediction should be utilized.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A coherence prediction mechanism for a multiprocessing computer system comprising:

a history cache including a plurality of cache entries, wherein each cache entry is configured to store coherence history information for a corresponding block of data, and wherein each cache entry includes a tag field for storing a tag portion of an address associated with said corresponding block of data; and a pattern memory including a plurality of pattern entries, wherein each pattern entry is configured to store a coherence prediction, and wherein a pattern address at which at a particular coherence prediction is stored within the pattern memory is generated from coherence history information stored within a corresponding cache entry of the history cache.

2. The coherence prediction mechanism as recited in claim 1, further comprising a pattern address translation unit coupled to said history cache and said pattern memory, wherein said pattern address translation unit is configured to generate said pattern address.

3. The coherence prediction mechanism as recited in claim 2 wherein said pattern address translation unit is configured to generate said pattern address based on a hashing function.

4. The coherence prediction mechanism as recited in claim 1 wherein the history cache implements a replacement algorithm to replace selected cache entries.

5. The coherence prediction mechanism as recited in claim 4 wherein the replacement algorithm is a least-recently used algorithm.

6. The coherence prediction mechanism as recited in claim 1 wherein the history cache is a set associative cache structure.

7. The coherence prediction mechanism as recited in claim 1 wherein the history cache is a direct mapped cache structure.

8. The coherence prediction mechanism as recited in claim 1 wherein the history cache is a fully associative cache structure.

9. A multiprocessing computer system comprising:
a plurality of processing nodes, wherein at least one of said processing nodes includes:
a memory cache configured to store a plurality of data blocks;
a history cache configured to store coherence history information for a selected subset of data blocks resident in the memory cache, wherein the history cache includes a plurality of history cache entries, wherein each history cache entry is configured to store coherence history information for a corresponding data block of the selected subset of data blocks; and
a pattern memory including a plurality of pattern entries, wherein each pattern entry is configured to store a coherence prediction.

10. The multiprocessing computer system as recited in claim 9 wherein a given pattern entry is accessed using a pattern address that is dependent upon the coherence history information for said corresponding data block.

11. The multiprocessing computer system as recited in claim 10 further comprising a pattern address translation unit coupled to said history cache and said pattern memory, wherein said pattern address translation unit is configured to generate said pattern address.

12. The multiprocessing computer system as recited in claim 11 wherein said pattern address translation unit is configured to generate said pattern address based on a hashing function.

13. The multiprocessing computer system as recited in claim 9 wherein the history cache implements a replacement algorithm to replace selected history cache entries.

14. The multiprocessing computer system as recited in claim 13 wherein the replacement algorithm is a least-recently used algorithm.

15. The multiprocessing computer system as recited in claim 9 wherein the history cache is a set associative cache structure.

16. The multiprocessing computer system as recited in claim 9 wherein the history cache is a direct mapped cache structure.

17. The multiprocessing computer system as recited in claim 9 wherein the history cache is a fully associative cache structure.

18. The multiprocessing computer system as recited in claim 9 further comprising a prediction controller coupled to receive said coherence prediction from the pattern memory, wherein said prediction controller is configured to control coherence operations.

19. A method for predicting coherence operations in a multiprocessing computer system, the method comprising:
storing coherence history information within each of a plurality of entries of a history cache, wherein each entry of the plurality of entries includes a tag field for storing a tag portion of an address associated with a corresponding block of data;
using the history information for a given entry to index into a pattern memory; and
obtaining a coherence prediction from an index location of said pattern memory.

20. A coherence prediction mechanism for a multiprocessing computer system, comprising:
a history cache including a plurality of cache entries, wherein each cache entry is configured to store coherence history information for a corresponding block of data, and wherein each cache entry includes a tag field for storing a tag portion of an address associated with said corresponding block of data;
a pattern memory including a plurality of pattern entries, wherein each pattern entry is configured to store a coherence prediction; and
an address filter coupled to said history cache, wherein said address filter is configured to filter out one or more incoming memory access messages.

21. The coherence prediction mechanism as recited in claim 20, wherein said address filter is configured to filter out incoming memory access messages other than read messages, write messages, and upgrade messages.

22. The coherence prediction mechanism as recited in claim 20, wherein said address filter is configured to filter out incoming memory access messages that do not correspond to memory blocks experiencing coherency misses.

23. The coherence prediction mechanism as recited in claim 20, wherein said address filter is configured to filter out the one or more incoming memory access messages in accordance with a specified filtering criterion.

24. The coherence prediction mechanism as recited in claim 20, wherein a pattern address at which at a particular coherence prediction is stored within the pattern memory is generated from coherence history information stored within a corresponding cache entry of the history cache.

25. The coherence prediction mechanism as recited in claim 24, further comprising a pattern address translation unit coupled to said history cache and said pattern memory, wherein said pattern address translation unit is configured to generate said pattern address.

* * * * *